United States Patent
Ketonen et al.

(10) Patent No.: US 6,366,774 B1
(45) Date of Patent: Apr. 2, 2002

(54) METHOD AND APPARATUS FOR PROVIDING RF OUTPUT POWER COMPENSATION FOR A BATTERY BACKUP SYSTEM

(75) Inventors: Veli-Pekka Ketonen, Irving; Steven J. Laureanti, Lewisville, both of TX (US)

(73) Assignee: Nokia Telecommunications, Oy, Espoo (FI)

(*) Notice: Subject to any disclaimer, the term of this patent is extended or adjusted under 35 U.S.C. 154(b) by 0 days.

(21) Appl. No.: 09/281,040

(22) Filed: Mar. 30, 1999

(51) Int. Cl.[7] .......................... H04Q 7/20; H04B 17/00; H04B 1/04; H04B 1/16

(52) U.S. Cl. .................. 455/424; 455/67.1; 455/574; 455/127; 455/343; 370/216; 370/311; 713/340; 713/324

(58) Field of Search .................... 455/424, 423, 455/575, 343, 550, 571–574, 90, 403, 522, 67.1, 67.6, 67.4, 13.4, 115, 127, 8, 9; 370/216, 311; 713/340, 324

(56) References Cited

U.S. PATENT DOCUMENTS

| | | | |
|---|---|---|---|
| 5,410,740 A | | 4/1995 | Hagstrom |
| 5,570,343 A | * | 10/1996 | Bishop et al. ............... 370/216 |
| 5,845,142 A | * | 12/1998 | Hayasaka ................... 713/340 |
| 5,870,685 A | * | 2/1999 | Flynn ......................... 455/573 |
| 5,930,242 A | * | 7/1999 | Mimura .................... 455/126 X |
| 5,960,327 A | * | 9/1999 | Eaton et al. ............. 455/343 X |
| 6,067,171 A | * | 5/2000 | Yamada et al. ............. 358/406 |

FOREIGN PATENT DOCUMENTS

GB     2 281 458 A     1/1995

OTHER PUBLICATIONS

Yasumasa, Hashimoto, *Load Controller*, Patent Abstracts of Japan, Matsushita Electric Works Ltd., Jan. 24, 1995, vol. 1995 No. 4.

Katsuya, Yoshida, Phantom–Feed Health Checking System Installed at Radio Base Station, Patent Abstracts of Japan, Saitama Nippon Denki KK, Dec. 18, 1998, vol. 1999, No. 3.

\* cited by examiner

*Primary Examiner*—Tracy Legree
(74) *Attorney, Agent, or Firm*—Altera Law Group, LLC

(57) ABSTRACT

A method and apparatus for monitoring the battery capacity of the battery backup system and for compensating the RF output power to increase the service availability of the cellular base station. The present invention provides compensation of RF output power when the battery back-up system is in use for a cellular base station. By monitoring the battery capacity and power consumption of the cellular base station, the RF output power can be compensated. This compensation in RF output power will increase the time that the cellular base station can operate within the battery backup mode. This therefore increases the cellular base station service availability and does not allow for any loss of network operator income.

12 Claims, 5 Drawing Sheets

METHOD AND APPARATUS FOR PROVIDING RF OUTPUT POWER COMPENSATION FOR A BATTERY BACKUP SYSTEM

BACKGROUND OF THE INVENTION

1. Field of the Invention

This invention relates in general to battery backup systems, and more particularly to a method and apparatus for monitoring the battery capacity of the battery backup system and for compensating the RF output power to increase the service availability of the cellular base station service during disconnected external power supply conditions.

2. Description of Related Art

Cellular communication systems are experiencing tremendous growth in the global communication market place. This growth is fueling many research programs and expanding the technology opportunities for all manufacturers of cellular equipment.

To attract customers and obtain a larger market share, cellular providers are pushing features enabled by the system's purely digital nature, such as Caller ID and short messaging, a paging equivalent. To further obtain a larger market share, cellular providers have turned to reducing the cost of air time. Cutting prices can take many forms. For example, vendors can give more free minutes per month, charge less for additional minutes, charge nothing for the first minute of incoming calls, reduce monthly fees, eliminate long-term contracts—all tactics available to the established cellular vendors as well. For a provider, this leads to less revenue per customer, but more incentive for increasing the market share. Thus, any reduction in customer traffic due to network problems has a tremendous impact on revenues and profits.

During an electrical power outage at a cellular base station site, the battery backup system is designed to maintain the operation of the base station until the electrical power is restored. Depending on the design of the battery backup system, the battery capacity, or the duration of the electrical power outage, the cellular base station may actually be forced to shut off and experience a certain amount of down time. This down time is directly related to the reduction in service availability and loss of network operator income. However, there is no commonly known method for monitoring the actual battery capacity of the battery backup system and compensating the RF output power to increase the service availability of the cellular base station service.

It can be seen that there is a need for a method and apparatus for monitoring the battery capacity of the battery backup system and for compensating the RF output power to increase the service availability of the cellular base station.

SUMMARY OF THE INVENTION

To overcome the limitations described above, and to overcome other limitations that will become apparent upon reading and understanding the present specification, the present invention discloses a method and apparatus for monitoring the battery capacity of the battery backup system and for compensating the RF output power to increase the service availability of the cellular base station.

The present invention solves the above-described problems by providing compensation of RF output power when the battery back-up system is in use for a cellular base station. By monitoring the battery capacity and power consumption of the cellular base station, the RF output power can be compensated. This compensation in RF output power will increase the time that the cellular base station can operate within the battery backup mode. This therefore increases the cellular base station service availability and does not allow for any loss of network operator income.

A method in accordance with the principles of the present invention includes monitoring a capacity of the battery backup system during a time interval, during the time interval monitoring a power level of a signal generated by the transmitter and compensating the output power of the signal generated by the transmitter to increase the lifetime of the battery backup system.

Other embodiments of a system or method in accordance with the principles of the invention may include alternative or optional additional aspects. One such aspect of the present invention is that the monitoring of the capacity of the battery backup system and the power level of the signal generated by the transmitter occurs at predetermined time intervals.

Another aspect of the present invention is that the compensating further comprises calculating a power consumption by the transmitter, the calculated power consumption corresponding to a predetermined time interval.

Another aspect of the present invention is that the compensating further comprises decreasing the power level of the signal generated by the transmitter to reduce the power consumption by the transmitter.

Another aspect of the present invention is that the transmitter comprises a power amplifier, the power amplifier generating the output signal to the mobile terminal.

In one embodiment of the invention, a base station includes a transmitter coupled to a primary power supply, the transmitter generating a radio signal at a controlled power level to a mobile terminal, a battery backup system, coupled to the transmitter, for providing system power to the transmitter during a failure of the primary power supply, the battery backup system having a capacity determining a time period that the battery backup system can provide system power to the transmitter, and a processor, coupled to the transmitter and the battery backup system, for monitoring a capacity of the battery backup system and the power level of the signal generated by the transmitter and compensating the output power of the signal generated by the transmitter to increase the time period that the battery backup system can provide system power to the transmitter.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized, as structural changes may be made without departing from the scope of the present invention.

The present invention provides compensation of RF output power when the battery back-up system is in use for a cellular base station. By monitoring the battery capacity and power consumption of the cellular base station, the RF output power can be compensated. This compensation in RF output power will increase the time that the cellular base station can operate within the battery backup mode. This therefore increases the cellular base station service availability and does not allow for any loss of network operator income.

Figure 1:
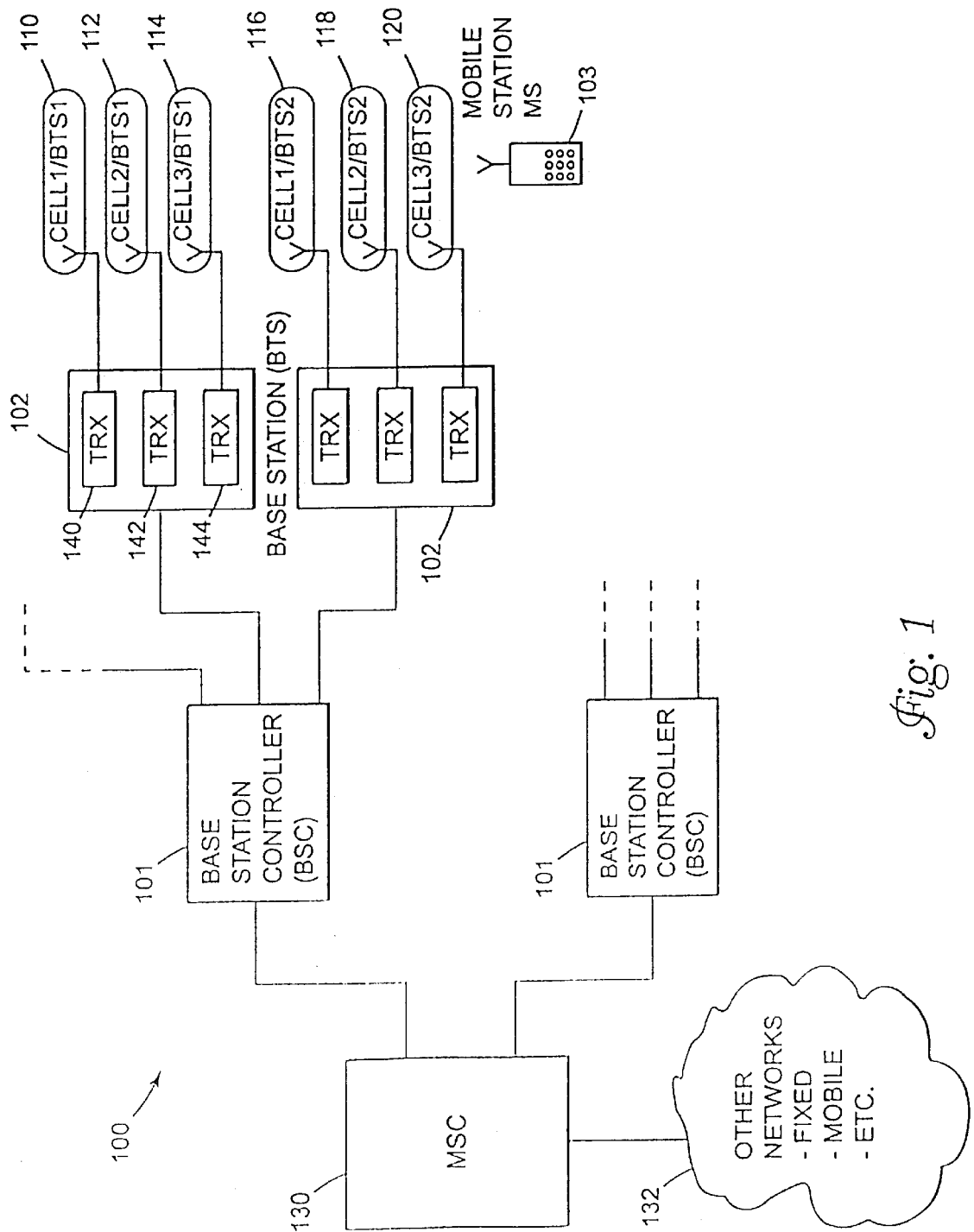
FIG. 1 illustrates a mobile communication system according to an embodiment of the present invention.

FIG. 1 illustrates a mobile communication system 100 according to an embodiment of the present invention. The system 100 is comprised of a plurality of base stations 102 connected to system controllers 101, and the plurality of mobile terminals 103. A service area of the mobile communication system 100 is divided into a plurality of cells 110–120. The mobile switching center 130 is connected with another mobile communication system or fixed network 132 and coordinates the setting up of calls to the mobile terminals 103. The mobile terminal 103 can move within a service area which is formed by a plurality of base stations 102 for communication through a channel allocated to the neighboring base station 102.

The base station 102 is a network element that interfaces the mobile terminal 103 to the network via the air interface. The primary function of the base station 102 is to maintain the air interface, or medium, for communication to any mobile terminal 103 within its cell. Other functions of the base station 102 are call processing, signaling, maintenance, and diagnostics. The base station 102 includes transceivers 140, 142, 144. The transceivers 140, 142, 144 provide coverage to cells 110, 112, 114 respectively, wherein each transmitter/receiver pair 140, 142, 144 comprises a channel unit. The transceivers 140, 142, 144 also receive calling signals sent from the mobile terminal 103 moving in the corresponding cell, and detect up-link carrier wave power of the received signal.

Figure 2:
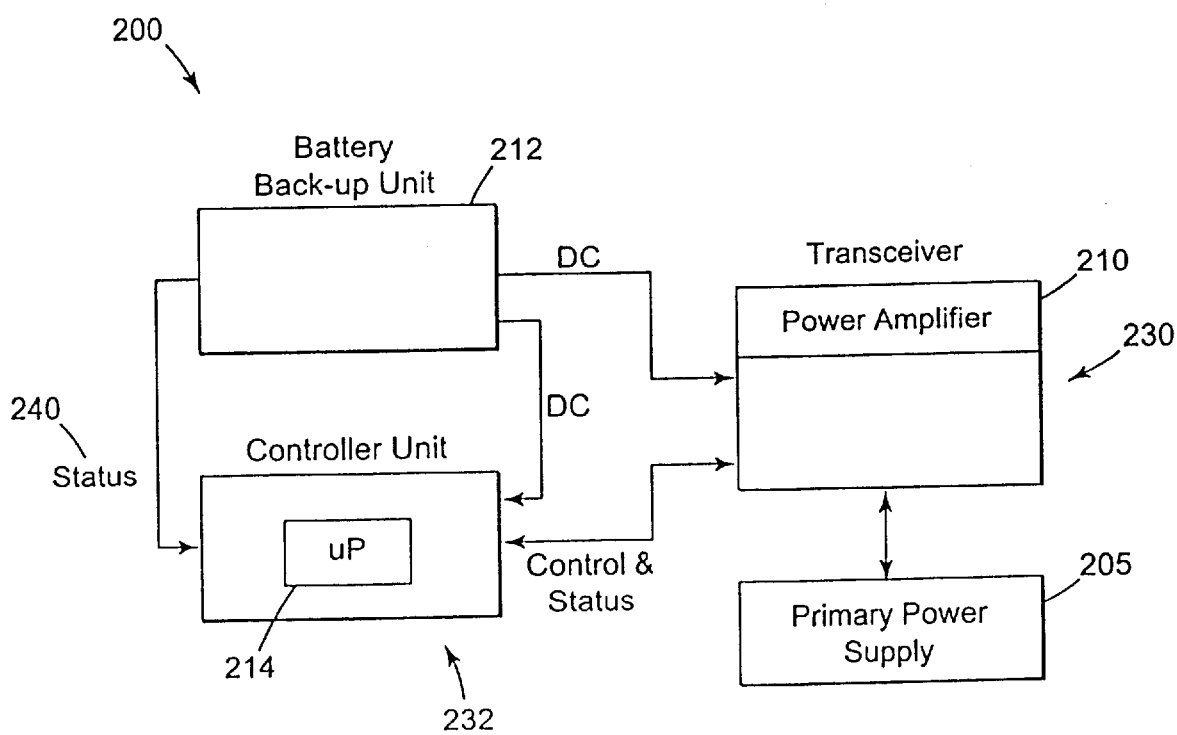
FIG. 2 illustrates a simplified block diagram of a base station according to the present invention.

FIG. 2 illustrates a simplified block diagram of a cellular base station 200. In FIG. 2, a power amplifier 210 of a transceiver 230 provides the RF output power for communicating with a base station (not shown). According to the present invention, a processor 214 in a cellular base station controller unit 232 measures the amount of battery capacity remaining in the battery back-up system 212 and compensates the RF output power provided by the power amplifier to maximize the use of the capacity of the battery back-up system 212. The capacity of the battery back-up system 212 is measured and recorded within certain time intervals by microprocessor 214 via status signal 240. The RF output power of the base station provided by the power amplifier 210 is also measured and recorded by the microprocessor 214 at the same time intervals as the capacity of the back-up batteries 212. With the RF output power recorded, the power consumption can then be calculated.

As one example, this calculation may be accomplished using a lookup table that was previous calibrated during the production of the base station system. Table 1, below, shows an example of a lookup table for RF output power versus power consumption.

TABLE 1

| RF Output Power | Power Consumption |
|---|---|
| 1 watt | 2.3 watts |
| 4 watts | 9.2 watts |
| 8 watts | 18.4 watts |
| 12 watts | 27.6 watts |
| 16 watts | 36.8 watts |
| 20 watts | 46.0 watts |
| 24 watts | 55.2 watts |
| 28 watts | 64.4 watts |
| 32 watts | 73.6 watts |

Figure 3:
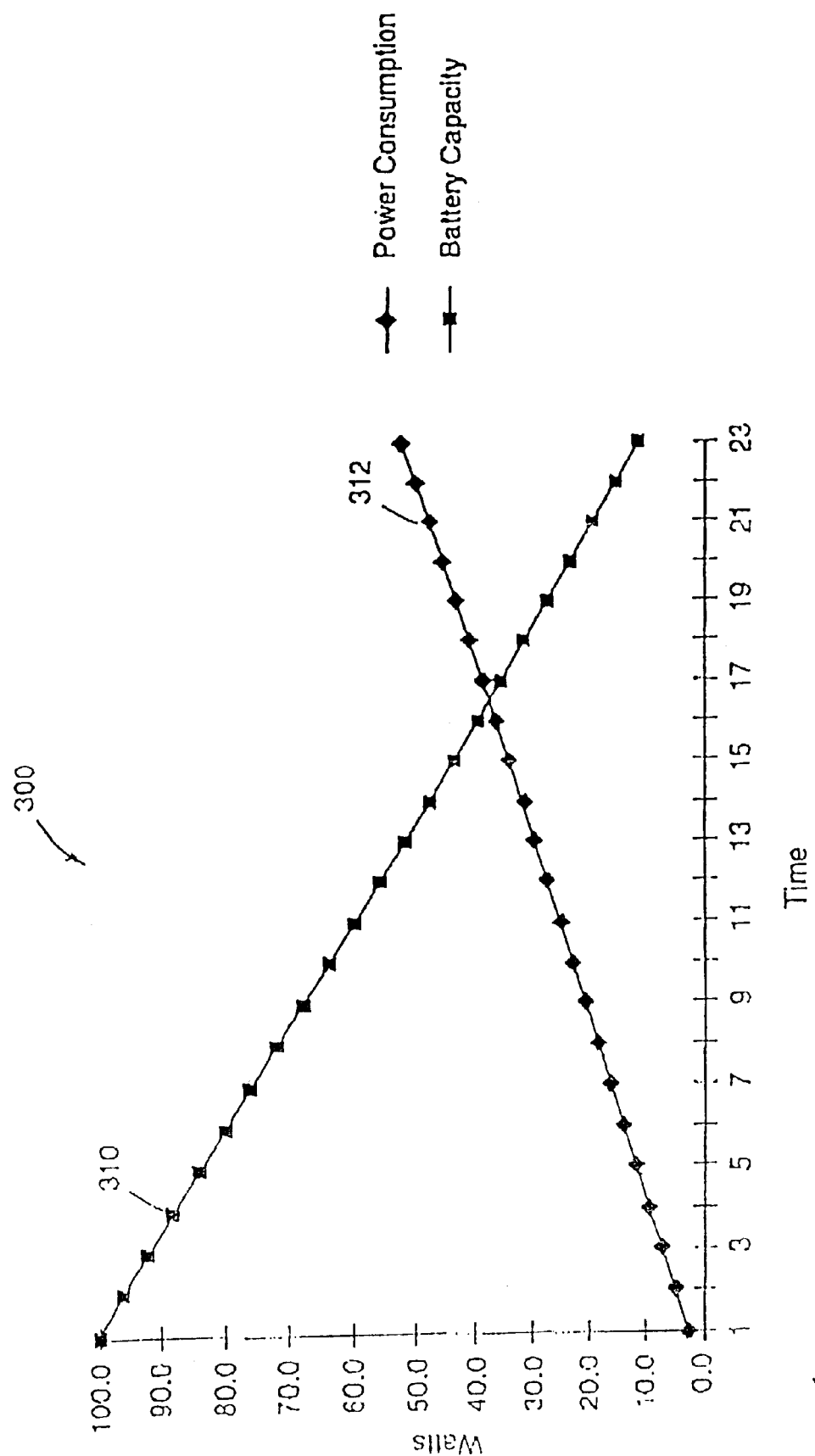
FIG. 3 is a plot of battery capacity and power consumption versus time without compensation according to the present invention.

FIG. 3 illustrates a plot 300 of the battery capacity 310 and power consumption over time. The power consumption 312 is a function of the RF output power of the base station as observed in Table 1 above. Accordingly, it can be seen that without any compensation to the RF output power, the drain on battery capacity is much faster with higher power consumption.

Figure 4:
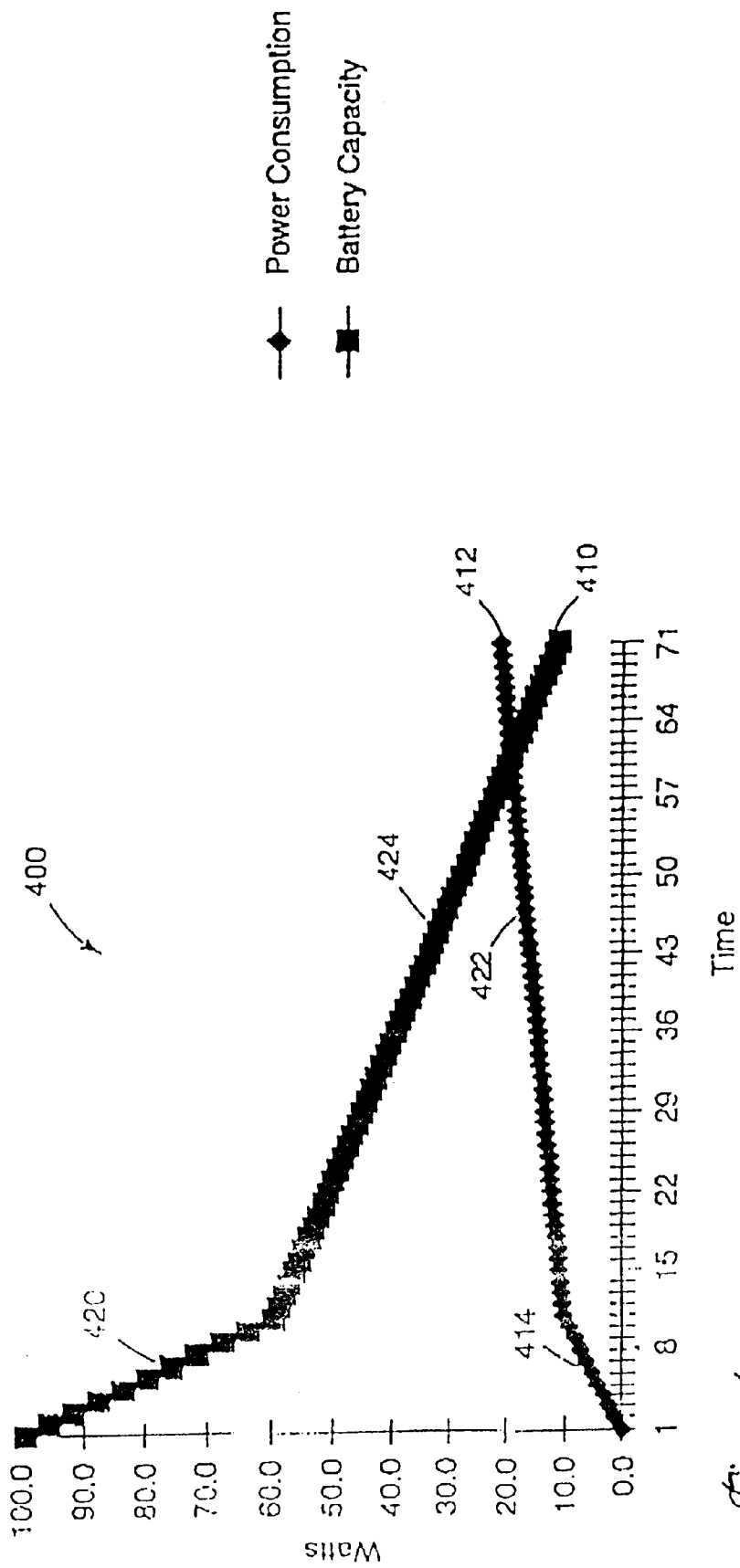
FIG. 4 is a plot of battery capacity and power consumption versus time with compensation according to the present invention.

FIG. 4 illustrates a plot 400 wherein the time that the cellular base station can utilize the battery backup is significantly increased by monitoring and compensating the RF output power according to the present invention. In FIG. 4, the power consumption 412 has a high slope 414 initially, thereby indicating rapid power consumption. Correspondingly, the battery capacity 410 illustrates a rapid fall off 420 during the same time period. However, by monitoring the power consumption and compensating the RF output power being generated, the rate of power consumption decreases as represented by the decrease in the slope of the power consumption plot 422. As a consequence, the rate that the battery drains is decreased 424. This results in a increase in the amount of time that the battery backup system may be used.

Figure 5:
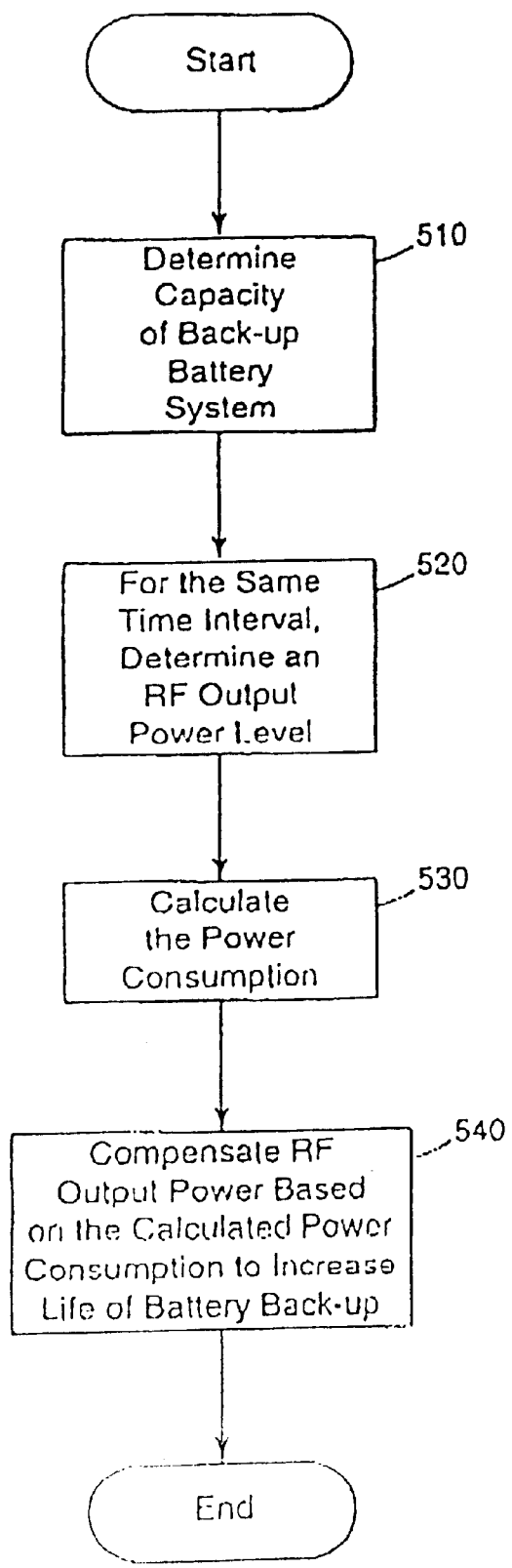
FIG. 5 is a flow chart of the power compensation method for increasing the lifetime of a battery backup system in a base station according to the present invention.

FIG. 5 illustrates a flow chart of the method for providing RF output power compensation to increase the service availability of the base station. First, the capacity of the backup battery system is determined 510. Then, a determination is made concerning, the RF output power level for the same time interval 520. Then, the power consumption is calculated 530. Finally, the RF output is compensated based upon the calculated power consumption to increase the life of the battery backup power system 540.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A base station, comprising:
   a transmitter coupled to a primary power supply, the transmitter generating a radio signal at a controlled power level to a mobile terminal;
   a battery backup system, coupled to the transmitter, for providing system power to the transmitter during a failure of the primary power supply, the battery backup system having a capacity determining a time period that the battery backup system can provide system power to the transmitter; and a processor, coupled to the transmitter and the battery backup system, for monitoring a capacity of the battery backup system and the power level of the signal generated by the transmitter and compensating the output power of the signal generated by the transmitter by decreasing the power level of the signal generated by the transmitter to increase the time period that the battery backup system can provide system power to the transmitter.

2. The base station of claim 1 wherein the processor monitors the capacity of the battery backup system and the power level of the signal generated by the transmitter at predetermined time intervals.

3. The base station of claim 2 wherein the processor calculates a power consumption by the transmitter, the calculated power consumption corresponding to a predetermined time interval.

4. The base station of claim 1 wherein the transmitter comprises a power amplifier, the power amplifier generating the output signal to the mobile terminal.

5. A method for increasing a lifetime of a battery backup system to a transmitter of a base station, comprising:

monitoring a capacity of the battery backup system during a time interval;

during the time interval, monitoring a power level of a signal generated by the transmitter; and compensating the output power of the signal generated by the transmitter by decreasing the power level of the signal generated by the transmitter to increase the lifetime of the battery backup system.

6. The method of claim 5 wherein the monitoring of the capacity of the battery backup system and the power level of the signal generated by the transmitter occurs at predetermined time intervals.

7. The method of claim 6 wherein the compensating further comprises calculating a power consumption by the transmitter, the calculated power consumption corresponding to a predetermined time interval.

8. The method of claim 5 wherein the transmitter comprises a power amplifier, the power amplifier generating the output signal to the mobile terminal.

9. A mobile communication system, comprising:

a mobile terminal for making and receiving mobile radio calls;

a base station for generating and receiving a radio signal to and from the mobile terminal, the base station including a base station controller and a plurality of base transceiver stations, the base transceiver stations include a transmitter coupled to a primary power supply, the transmitter generating the radio signal to the mobile terminal and the base station controller monitoring and controlling the base transceiver stations; and a system controller, coupled to the base station, for coordinating call setup to and from the mobile terminals;

wherein a base transceiver station further comprises:
a battery backup system, coupled to the transmitter, for providing system power to the transmitter during a failure of the primary power supply, the battery backup system having a capacity determining a time period that the battery backup system can provide system power to the transmitter; and a processor, coupled to the transmitter and the battery backup system, for monitoring a capacity of the battery backup system and the power level of the signal generated by the transmitter and compensating the output power of the signal generated by the transmitter by decreasing the power level of the signal generated by the transmitter to increase the time period that the battery backup system can provide system power to the transmitter.

10. The mobile communication system of claim 9 wherein the processor monitors the capacity of the battery backup system and the power level of the signal generated by the transmitter at predetermined time intervals.

11. The mobile communication system of claim 10 wherein the processor calculates a power consumption by the transmitter, the calculated power consumption corresponding to a predetermined time interval.

12. The mobile communication system of claim 9 wherein the transmitter comprises a power amplifier, the power amplifier generating the output signal to the mobile terminal.

* * * * *